United States Patent
Grohs

(10) Patent No.: US 7,146,058 B2
(45) Date of Patent: Dec. 5, 2006

(54) COMPRESSION OF IMAGES USING OBJECT MAPS

(75) Inventor: Randall E. Grohs, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 828 days.

(21) Appl. No.: 10/423,623

(22) Filed: Apr. 26, 2003

(65) Prior Publication Data

US 2004/0213475 A1 Oct. 28, 2004

(51) Int. Cl.
G06K 9/36 (2006.01)
G06K 9/00 (2006.01)
H04N 1/46 (2006.01)

(52) U.S. Cl. ...................... 382/243; 382/166

(58) Field of Classification Search ............... 382/162, 382/164, 166, 173, 224, 232, 233, 239, 243, 382/249; 358/515, 523, 534, 539; 341/50, 341/51, 65, 67; 375/240.16, 240.25; 707/101; 708/203; 711/207
See application file for complete search history.

(56) References Cited

U.S. PATENT DOCUMENTS

| | | | | |
|---|---|---|---|---|
| 5,563,660 A | * | 10/1996 | Tsukagoshi | 375/240.25 |
| 5,668,897 A | | 9/1997 | Stolfo | |
| 5,696,927 A | * | 12/1997 | MacDonald et al. | 711/207 |
| 5,748,780 A | | 5/1998 | Stolfo | |
| 6,037,988 A | * | 3/2000 | Gu et al. | 375/240.16 |
| 6,130,630 A | | 10/2000 | Grohs et al. | |
| 6,330,363 B1 | | 12/2001 | Accad | |
| 6,415,058 B1 | | 7/2002 | Grohs et al. | |
| 6,526,178 B1 | * | 2/2003 | Fukuhara | 382/249 |
| 6,567,559 B1 | * | 5/2003 | Easwar | 382/239 |
| 6,594,385 B1 | * | 7/2003 | Grohs et al. | 382/166 |
| 6,956,507 B1 | * | 10/2005 | Castelli et al. | 341/50 |
| 2001/0041003 A1 | | 11/2001 | Grohs et al. | |
| 2001/0043753 A1 | | 11/2001 | Grohs et al. | |
| 2002/0176624 A1 | * | 11/2002 | Kostrzewski et al. | 382/173 |
| 2003/0235338 A1 | * | 12/2003 | Dye | 382/232 |
| 2003/0235341 A1 | * | 12/2003 | Gokturk et al. | 382/243 |
| 2004/0213475 A1 | * | 10/2004 | Grohs | 382/243 |

FOREIGN PATENT DOCUMENTS

GB 2345401 A 7/2000

* cited by examiner

*Primary Examiner*—Amir Alavi

(57) ABSTRACT

Various systems, methods, and programs embodied in computer readable mediums are provided for compression of a page frame that includes a number of pixels. In one embodiment, an object map is generated that includes a number of values, each of the values being associated with a corresponding one of the pixels in the page frame. Also, a compressed image file is generated of the page frame that is associated with the object map. Each of the values in the object map indicates whether a blank color conversion or one of a number of predefined color conversions is to be performed during a reconstruction of a corresponding one of the pixels, wherein each of the predefined color conversions includes a corresponding degree of gray component replacement.

20 Claims, 5 Drawing Sheets

COMPRESSION OF IMAGES USING OBJECT MAPS

BACKGROUND

A digital image is typically display or printed in the form of a rectangular array of "picture elements" or "print elements". Both picture elements and print elements are often referred to as "pixels". Digital images are typically represented in a computer by one or more arrays of binary numbers. For example, a monochrome digital image can be represented in a computer by a single array of binary numbers. Each binary number in the array defines a gray-level value for an associated pixel. The position of the binary number in the array describes a spatial location of the pixel.

A color digital image can be represented in a computer by three arrays of binary numbers. These arrays are commonly referred to as "image planes" that represent an axis of a suitable color coordinate system in accordance with well-known trichromatic theory. The color of a pixel in the digital image is defined by an associated binary number from each array that represents one of three color components from the color coordinate system. There are many color coordinate systems that can be used to represent the color of a pixel. These color coordinate systems include, for example, a "Red-Green-Blue" (RGB) coordinate system and a Cyan-Magenta-Yellow (CMY) coordinate system. The former is commonly used in monitor display applications, whereas the latter is commonly used in printing applications.

The amount of data used to represent a digital image can be extremely large. Consider, for example, a color digital image consisting of 1024×1024 pixels. If the pixels are represented in the computer by three image planes of 8-bit numbers, the digital image would occupy over 1 megabyte of storage space. The large amount of data required to represent a digital image in a computer can result in significant costs that are associated both with increased storage capacity requirements, and the computer resources and time required to transmit the data to another computing device such as a printer, etc.

BRIEF DESCRIPTION OF THE SEVERAL VIEWS OF THE DRAWINGS

The various embodiments of the invention can be understood with reference to the following drawings. The components in the drawings are not necessarily to scale. Also, in the drawings, like reference numerals designate corresponding parts throughout the several views.

DETAILED DESCRIPTION

Figure 1:
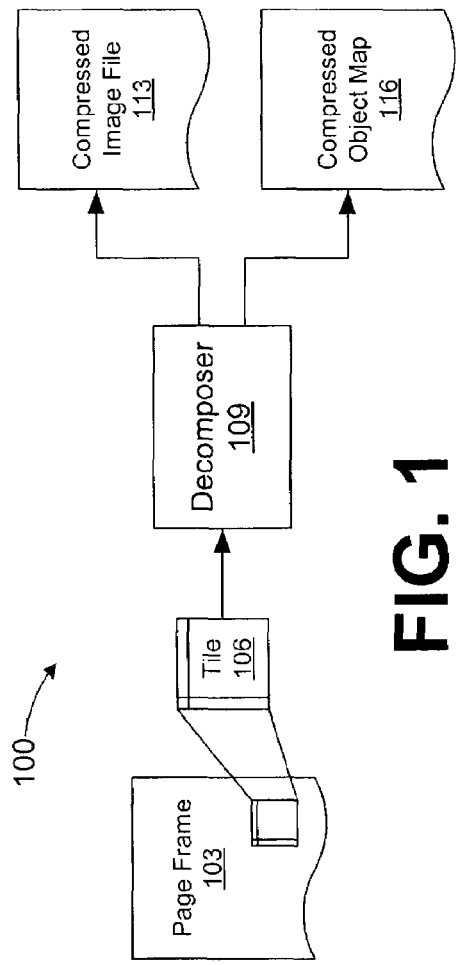
FIG. 1 is a functional block diagram of a compression operation according to an embodiment of the present invention.

Referring to FIG. 1, shown is a functional block diagram of a compression operation 100 according to an embodiment of the present invention. In this respect, a page frame 103 that embodies a document, image, or other content to be rendered for a user is provided. In this respect, "rendering" is defined herein as presenting such content to user in one of a number ways such as, for example, printing on a printer, displaying on a display device, or other types of rendering as can be appreciated by those with ordinary skill in the art. For some rendering operations such as printing, for example, it is necessary to transmit the content embodied in one or more page frames 103 from computer systems to printing devices over networks or other data communications links, etc. Due to the significant size of the average page frame 103, the transmission of page frames 103 may present a burden for such networks or other data communications links.

Accordingly, the page frames 103 are compressed in accordance with an embodiment of the present invention. Specifically, the compression operation 100 provides for the compression of page frames 103 in a manner that can reduce artifact and other losses due to compression algorithms as will be discussed.

To facilitate the compression operation 100, the page frame 103 is split up into a number of portions referred to herein as "tiles" 106. Each of the tiles 106 is applied to a decomposer 109. The decomposer 109 processes the tiles 106 and ultimately generates a compressed image file 113 and a compressed object map 116 there from. The compression performed by the decomposer 109 in generating the compressed image file 113 may be performed using any one of a number of compression algorithms such as, for example, those lossy compression algorithms that make use of a frequency transform (e.g. the discrete cosine transform). Examples of such algorithms are set forth, for example, by the Joint Photographic Experts Group (JPEG). When complete, the object map 116 may be compressed, for example, using a lossless compression algorithm or other algorithm.

The compressed object map 116 includes a number of values, where each of the values is associated with one of the pixels of the page frame 103. These values provide information regarding the corresponding pixels in the page frame 103. In this respect, each of the values may indicate, for example, a type of color conversion that is to be performed for each of the pixels during the reconstruction of the page frame 103 from the compressed image file 113 and the compressed object map 116. Each of the color conversions may be performed using an appropriate color table as will be discussed. In addition, each of the values in the compressed object map 116 may indicate a type of half-toning that is associated with the respective pixels.

In this respect, each of the pixels in the page frame 103 may comprise, for example, a blank color (i.e. white space) or a color that requires one of a number of predefined levels of under color removal or gray component replacement in conjunction with a respective color conversion. In this respect, each of the pixels may comprise colors that are expressed in a predefined color space such as, for example, Cyan-Magenta-Yellow (CMY) that are converted into a second color space such as a Cyan-Magenta-Yellow-Black (CMYK) color space. Also, the pixels making up a respective tile 106 may comprise high frequency or low frequency content that may be subject to an appropriate type of half-toning such as low frequency half-toning or high frequency half-toning.

The values in the object map 116 indicate the above features of each of the pixels. That is to say, each of the values in the object map 116 may be one of a number of predefined values that represent specific information about a respective pixel. The values may vary in what that they represent. For example, in one embodiment, the object map 116 includes values that represent blank pixels, or pixels that comprise colors that are subject to various degrees of gray component replacement, etc. For example, a first color conversion from CMY to CMYK may involve a lesser degree of gray component replacement whereas a second color conversion from CMY to CMYK may involve a greater degree of gray component replacement. In this respect, the degree of gray component replacement for the first color conversion may be less than the degree of gray component replacement for the second color conversion from color to color. Table 1 below specifies such values to represent blank pixels and pixels having a color that requires a greater or lesser degree of gray component replacement as follows:

TABLE 1

| Object Map Value | Feature |
| --- | --- |
| 00 | Blank Pixel-Blank Color Conversion |
| 01 | CMY to CMYK Color Conversion with first degree (lesser) of gray component replacement |
| 10 | CMY to CMYK Color Conversion with second degree (greater) of gray component replacement |

In another embodiment, Table 2 below specifies the values that are employed within the object map 116 to indicate blank pixels and half-toning as follows:

TABLE 2

| Object Map Value | Feature |
| --- | --- |
| 00 | Blank Pixel-Blank Color Conversion |
| 01 | First Frequency Half-toning (i.e. Low Frequency) |
| 10 | Second Frequency Half-toning (i.e. High Frequency) |

In still another embodiment, the values within the object map indicate blank pixels, neutral pixels, color pixels, and half-toning is as follows:

TABLE 3

| Object Map Value | Feature |
| --- | --- |
| 000 | Blank Pixel-Blank Color Conversion |
| 001 | CMY to CYMK Color Conversion with first degree (lesser) of gray component replacement-First Freq Half-toning |
| 010 | CMY to CYMK Color Conversion with first degree (lesser) of gray component replacement-Second Freq Half-toning |
| 011 | CMY to CYMK Color Conversion with second degree (greater) of gray component replacement-First Frequency Half-toning |
| 100 | CMY to CYMK Color Conversion with second degree (greater) of gray component replacement-Second Frequency Half-toning |

Thus, the compressed object map 116 is associated with the compressed image file 113 in that it includes values that relay predefined information regarding associated ones of the pixels in the page frame 103. In this respect, the compressed image file 113 may be reduced in size using, for example, a lossy compression algorithm to provide for efficient transmission and manipulation during rendering operations such as, for example, during a print operation. By maintaining information about each of the pixels as they exist prior to compression in the object map 116, any artifact or image distortion caused by the lossy compression algorithm is reduced or eliminated. Specifically, a change in color that may occur to various pixels such as, for example, blank pixels near a text character due to the use of a lossy compression algorithm may be reduced or eliminated as the nature of such pixels is preserved in the object map 116. In this respect, the object map 116 accompanies the compressed image file 113 to be accessed during a rendering operation. Also, a desired intent that a particular color of a pixel is to be created using more or less gray component replacement (i.e. more or less "K" component in a CYMK color space) when converting from CMY to CMYK.

The order or size of the values that represent each characteristic about the pixels will depend upon how many different characteristics are represented. For example, the maximum order above in Table 3 is three digits given that there are five permutations of characteristics to represent for the pixels. It is possible that many more permutations of characteristics may exist. As the order of the values within the object map 116 increases, the amount of data that makes up the object map 116 increases accordingly. Thus, the total number of different values that may be included in an object map in this respect is limited by the fact that the object map 116 may become too large such that the benefits of compression are lost.

That is to say, the page frame 103 may be compressed, but the object map 116 would be so large that it reduces or eliminates any benefit obtained from the compression performed, given that the object map 116 accompanies the page frame 103 during a rendering operation. In addition, a rendering device such as a printer may include limited memory to store the compressed image file 113 and the object map 116 either in whole or in part during a rendering operation. If the object map 116 grows too large, such devices may not be able to accommodate the compressed image file 113 and the object map 116.

Figure 2:
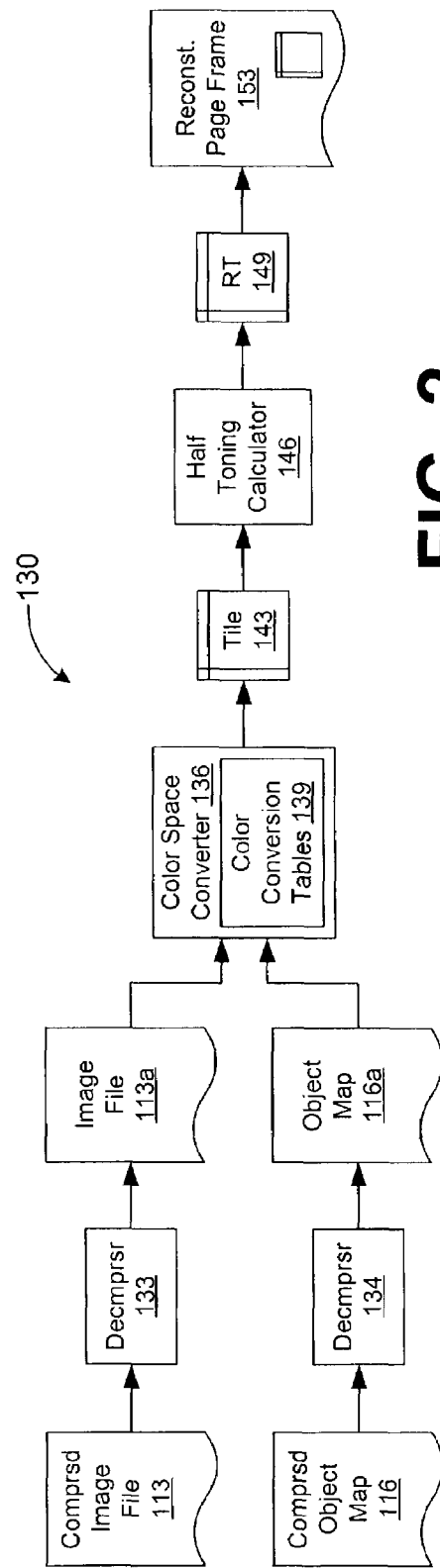
FIG. 2 is a functional block diagram of a decompression operation according to an embodiment of the present invention.

Turning next to FIG. 2, shown is a functional block diagram of a decompression operation 130 according to an embodiment of the present invention. To perform the decompression operation 130, a decompressor 133 is employed to decompress the compressed image file 113. In addition, the object map 116 may be decompressed by an appropriate decompressor 134. The resulting information is provided to a color space converter 136. The color space converter 136 employs a number of color space conversion tables 139 to perform a conversion for each one of the pixels obtained from the compressed image file 113. Specifically, each of the values in the object map 116 indicates a type of color conversion, i.e. blank, CMY-to-CMYK, or other color conversion, that is to be employed for the respective pixel. Thus, each of the values in the object map 116 indicates which one of the color conversion tables 139 that is to be used for the conversion of each of the pixels.

The color conversion table 139 for the blank pixels generates a blank output regardless of the input pixel color. That is to say, that the color conversion table 139 employed to perform a blank color conversion maps all input colors to a blank output color. This eliminates the occurrence of artifact and other anomalies that would cause black or other color to be printed in such pixels due to the compression performed. For JPEG compression, such artifact may occur, for example, along the borders of letters in black and white text, etc.

In addition, various color conversion tables 139 may be employed that provide for varying degrees of gray component replacement when converting, for example, a color expressed in a CMY color space to a CYMK color space. In this respect, an intent that a color be created with a greater or lesser degree of gray component replacement is maintained through compression and decompression.

The color conversions performed by the color space converter 136 are performed on the pixels on a tile by tile basis. Thus, the output of the color space converter 136 is a tile 143 that is then applied to a half-toning calculator 146. The half-toning calculator 146 determines the half-toning for each of the pixels in the tile 143, thereby generating a reconstructed tile 149 that is stored as a portion of a reconstructed page frame 153. However, in some situations, the half-toning calculator 146 may not be employed. This may be the case, for example, where half-toning is not indicated by the values in the object map 116 for a particular tile 143 output by the color space converter 136. Alternatively, the half-toning calculator 146 may not exist as part of the decompression operation 130. Accordingly, none of the values that may be employed to generate the object map 116 would indicate half-toning such as is the case in Table 1 above. In such case, the tiles 143 output by the color space converter 136 are applied directly to the reconstructed page frame 153.

Figure 3:
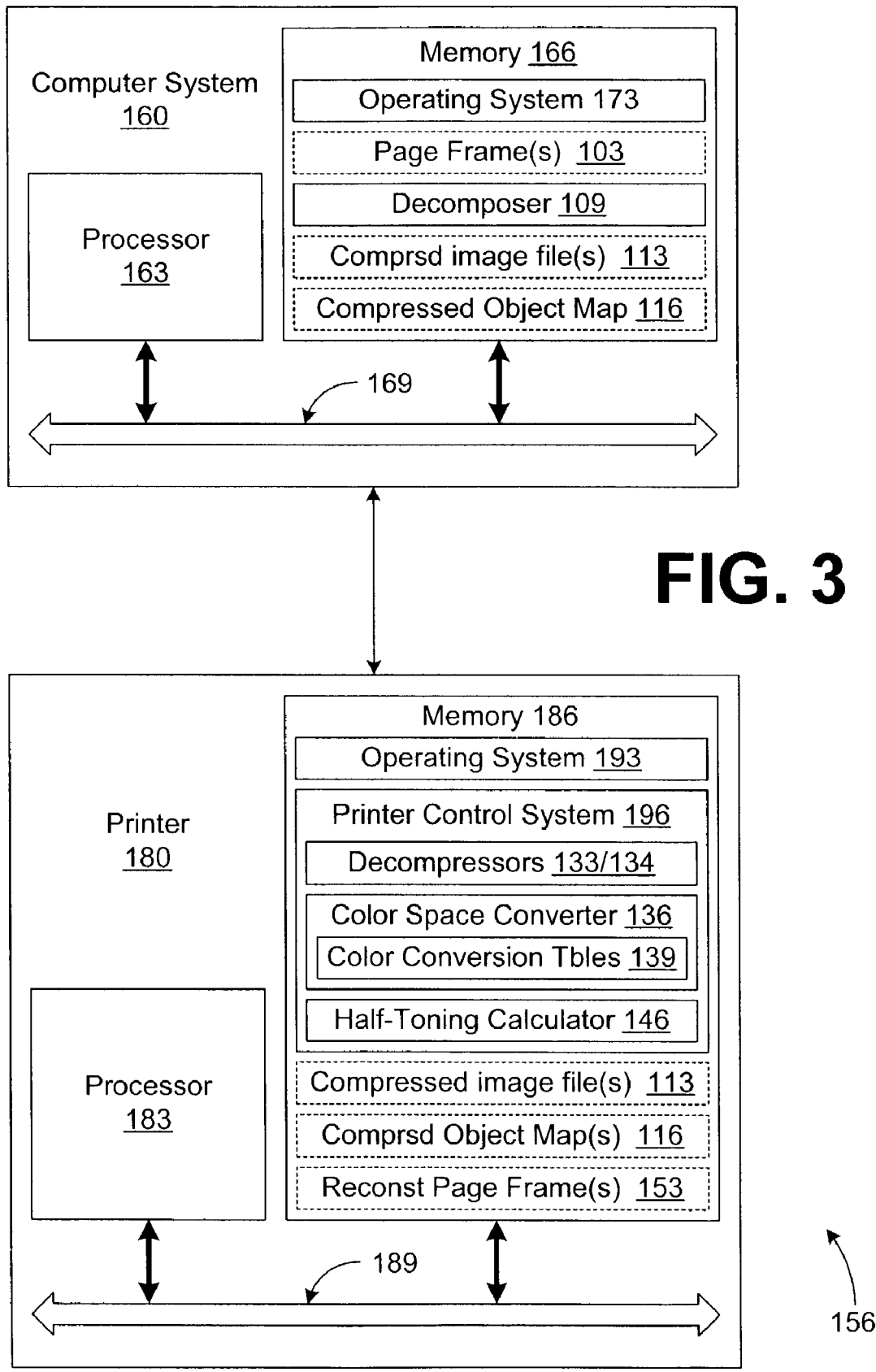
FIG. 3 is a block of a printing network that comprises a computer system that is in data communication with a printer.

With respect to FIG. 3, shown is an example of a printing network 156 according to an embodiment of the present invention. In this respect, the printing network 156 includes a computer system 160 or equivalent device that features a processor circuit having a processor 163 and a memory 166, both of which are coupled to a local interface 169. The local interface 169 may be, for example, a data bus with a control/address bus as can be appreciated by those with ordinary skill in the art.

The computer system 160 may also include one or more peripheral devices such as, for example, a keyboard, keypad, touch pad, touch screen, microphone, scanner, mouse, joystick, one or more push buttons, or other devices, etc. The peripheral devices may also include display devices, indicator lights, speakers, or other devices, etc. Specific display devices may be, for example, cathode ray tubes (CRTs), liquid crystal display screens, gas plasma-based flat panel displays, or other types of display devices, etc.

A number of software components are stored in the memory 166 and are executable by the processor 163. In this respect, the components include an operating system 173 and the decomposer 109. The decomposer 109 may be, for example, a component within a printer driver or maybe part of an application, etc. As such, it is understood that there may be other software components or applications that stored in the memory 166 and are executable by the processor 163. In addition, one or more page frames 103 are stored in the memory 166. The page frames 103 may have been generated by an appropriate application such as a word processor, image editing program, or other application, etc. In addition, one or more compressed image files 113 and one more corresponding object maps 116 may also be stored in the memory 166 having been generated by the operation of the decomposer 109 as was described above. Such may be the case, for example, during the compression of a multipage document with the rendering of multiple documents, etc.

The printing network 156 also includes a printer 180 that is in data communication with the computer system 160. In this respect, the printer 180 may be coupled to the computer system 160 to a direct local link or through a network as can be appreciated by those with ordinary skill in the art. The direct local link may employ, for example, a parallel interface, Universal Serial Bus (USB), or other type of link. The printer 180 includes a processor circuit having a processor 183 and a memory 186, both of which are coupled to a local interface 189. In this respect, the local interface 189 may be, for example, a data bus with an accompanying control/address bus as can be appreciated by those with ordinary skill in the art. In this respect, the processor circuit within the printer 180 may be, for example, the printer firmware or other processing capacity.

Several components are stored in the memory 186 and are executable by the processor 183 in order to perform various functions or operations of the printer 180. Such components may comprise, for example, an operating system 193 and a printer control system 196. The printer control system 186 generally provides for the operation and control the various components of the printer 180 in performing printing operations. The printer control system 196 includes the decompressors 133 and 134, the color space converter 136, and the half-toning calculator 146. Also stored in the memory 186 are one more compressed image files 113, object maps 116, and reconstructed page frames 153. As was described above, the decompressors 133 and 134, the color space converter 136 and the half-toning calculator 146 generate the reconstructed page frames 153 from the corresponding compressed image files 113 and object maps 116.

The memories 166 and 186 are each defined herein as both volatile and nonvolatile memory and data storage components. Volatile components are those that do not retain data values upon loss of power. Nonvolatile components are those that retain data upon a loss of power. Thus, the memories 166 and 186 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 163 and 183 may represent multiple processors and each of the memories 166 and 186 may represent multiple memories that operate in parallel processing circuits, respectively. In such a case, each of the local interfaces 169 and 189 may be an appropriate network that facilitates communication between any two of the multiple processors, between any processor and any of the memories, or between any two of the memories, etc. The processors 163 and 183 may be of electrical, optical, or molecular construction, or of some other construction as can be appreciated by those with ordinary skill in the art.

In addition, the operating systems 173 and 193 are executed to control the allocation and usage of hardware resources in the computer system 160 and the printer 180, respectively. The hardware resources may include memory, processing time and peripheral devices, etc. In this manner, the operating systems 173 and 193 serve as the foundation on which applications depend as is generally known by those with ordinary skill in the art.

Figure 4:
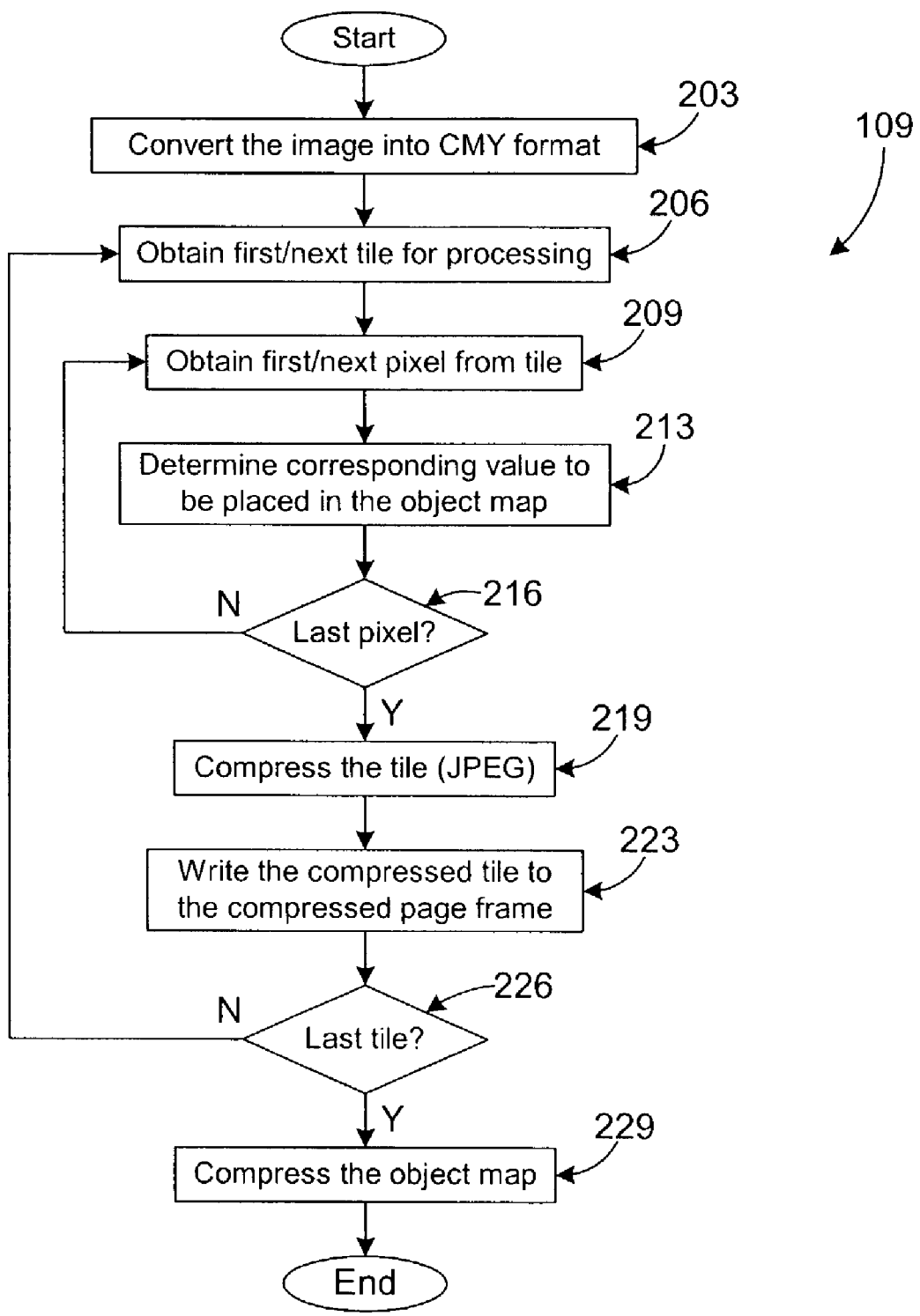
FIG. 4 depicts an exemplary flow chart of a decomposer executed in the computer system of FIG. 3 to compress a page frame to be printed by the printer of FIG. 3 into a compressed image file.

Referring next to FIG. 4, shown is a flow chart that provides one example of the operation of the decomposer 109 that generates the compressed image file 113 (FIG. 1) and the compressed object map 116 (FIG. 1) according to an embodiment of the present invention. Alternatively, the flow chart of FIG. 4 may be viewed as depicting steps of an example of a method implemented in the computer system 160 to generate the compressed image file 113 and the compressed object map 116. The functionality of the decomposer 109 as depicted by the exemplary flow chart of FIG. 4 may be implemented, for example, in an object oriented design or in some other programming architecture. Assuming the functionality is implemented in an object oriented design, then each block represents functionality that may be implemented, for example, in one or more methods that are encapsulated in one or more objects. The decomposer 109 may be implemented using any one of a number of programming languages such as, for example, C++, JAVA™, or other suitable programming languages.

Beginning with box 203, the decomposer 109 first converts an image that is embodied in the page frame 103 into an appropriate color space such as a Cyan-Magenta-Yellow (CMY) color space for further processing. The page frame 103 may originally be expressed in a different color space such as, for example, a Red-Green-Blue (RGB) color space. Thereafter, in box 206, a first one of the tiles 106 (FIG. 1) is obtained from the page frame 103 for processing. Then, in box 209 a first pixel is designated from the current tile 106 for processing. Thereafter, in box 213 the current pixel is examined to determine which value is to be placed in the corresponding position of the object map 113. The actual value written to the object map 113 depends upon the nature of the pixel as well as the potential values that may be written to the object map 113.

For example, the decomposer 109 may identify that the pixel is a blank pixel in that there is no color to deposit in its position, for example, on a page. Such may be the case, for example, with the non-printed areas of a page of text. Assuming that the pixel is identified as a blank pixel, then the decomposer 109 writes a blank color conversion value to the object map 116 such as the values indicated in Tables 1–3 described above. Alternatively, the decomposer 109 may identify that the pixel is comprised of a color that is subject to a first degree of gray component replacement. Also, a pixel may be comprised of a color that is subject to a second degree of gray component replacement, where the second degree of gray component replacement is less than the first degree of gray component replacement. In this respect, the first degree of gray component replacement may involve a significant amount of gray component replacement whereas the second degree of gray component replacement may involve little or no gray component replacement. In any event, the resulting color created will differ based upon the amount of gray component replacement. The actual degree of gray component replacement that is associated with a specific color conversion may be predefined. In addition, any number of degrees of gray component replacement may be specified by corresponding values in the object map 116. In any event, the decomposer 109 writes a value into the object map 116 for the corresponding degree of gray component replacement such as the values indicated in tables 1–3 above.

In addition, the decomposer 109 may identify a type of half-toning that is to be applied to the pixel. If such is the case, then the decomposer 109 writes an appropriate value to the object map 116 for the pixel that indicates the type of half-toning to be applied to the pixel. In this respect, the value applied to the object map 116 may indicate both the type of half-toning as well as the type of color conversion to be applied to the pixel in the decompression operation 130 (FIG. 2) as is indicated in Table 3 above.

The types of half-toning that may be applied may be, for example, half-toning of predefined frequencies. For example, a first type of half-toning may be a low frequency half-toning and a second type of half-toning may be a high frequency half-toning. In this respect, the frequency of the high frequency half-toning may be greater than the frequency of the low frequency half-toning. Alternatively, there may be more than two types of half-toning of various frequencies or frequency ranges that may be specified. However, the number of different half-toning frequencies may be limited by the pool of different values that can be included in the object map 116 to represent information about each pixel. That is to say, if there are too many types of half-toning to represent in the object map 116, then the object map 116 may be too large, thereby reducing or eliminating the benefits of compression as was described above.

Assume, for example, that the types of half-toning that may be represented in the object map 116 are a low frequency half-toning and a high frequency half-toning, where, for example, the high frequency half-toning has a frequency that is greater than or equal to a predefined threshold and the low frequency half-toning has a frequency that is less than the predefined threshold. In such case, to determine the type of half-toning that applies to a respective pixel, the color values of each of the pixels in a respective tile 106 may be averaged in order to determine an average pixel color value. If the difference between the average pixel color value and any of the pixels in the current tile 106 falls outside of a predefined threshold range, then a value representing the high frequency half-toning is applied to the object map 116 for each of the pixels in the tile 106. Otherwise, a low frequency half-toning value is applied to the object map 116 for each of the pixels in the tile 106. In this respect, the resolution of the image in the tile 106 is determined.

The specification of the predefined threshold range directs which half-toning is to be applied to the pixels of a respective tile 106. Alternatively, a number of ranges may be specified that may be consulted to identify any one of a number types of half-toning of various frequencies for which corresponding values are placed in the object map 116.

In any event, a value is placed in the object map 116 in a position corresponding to or in association with the current pixel that indicates the specific nature of the pixel before compression. This value can thus be interpreted by the color space converter 136 and/or the half-toning calculator 146 during the decompression operation 130.

Once an appropriate value is determined for the pixel and written to the object map 116, then in box 216 the decomposer 109 determines whether a value has been placed in the object map 116 for the last pixel in the current tile 106. If not, then the decomposer 109 reverts back to box 209 to obtain the next pixel from the tile to determine its corresponding value in the object map 116. Otherwise, the decomposer 109 proceeds to box 219 in which the tile 106 is compressed using an appropriate compression algorithm such as a discrete cosine transform as is set forth by the Joint Photographic Experts Group (JPEG) or other appropriate algorithm.

Thereafter, in box 223 the compressed tile is written to the compressed image file 113 (FIG. 1). Then, in box 226, if the last tile 106 has been processed, the decomposer 109 proceeds to box 229 in which the object map 116 is compressed using a lossless compression algorithm or other compression algorithm. Otherwise, the decomposer 109 reverts back to box 206 to begin processing the next tile 106 from the page frame 103. In compressing the object map 116 in box 229, the use of a lossless compression algorithm may be desirable, although it is possible to employ a lossy compression algorithm to compress the object map 116. However, if a lossy compression algorithm is employed, inaccuracies will appear in the resulting reconstructed page frame 153. Once the object map 116 has been compressed in box 229, then the decomposer 109 ends as shown.

Figure 5:
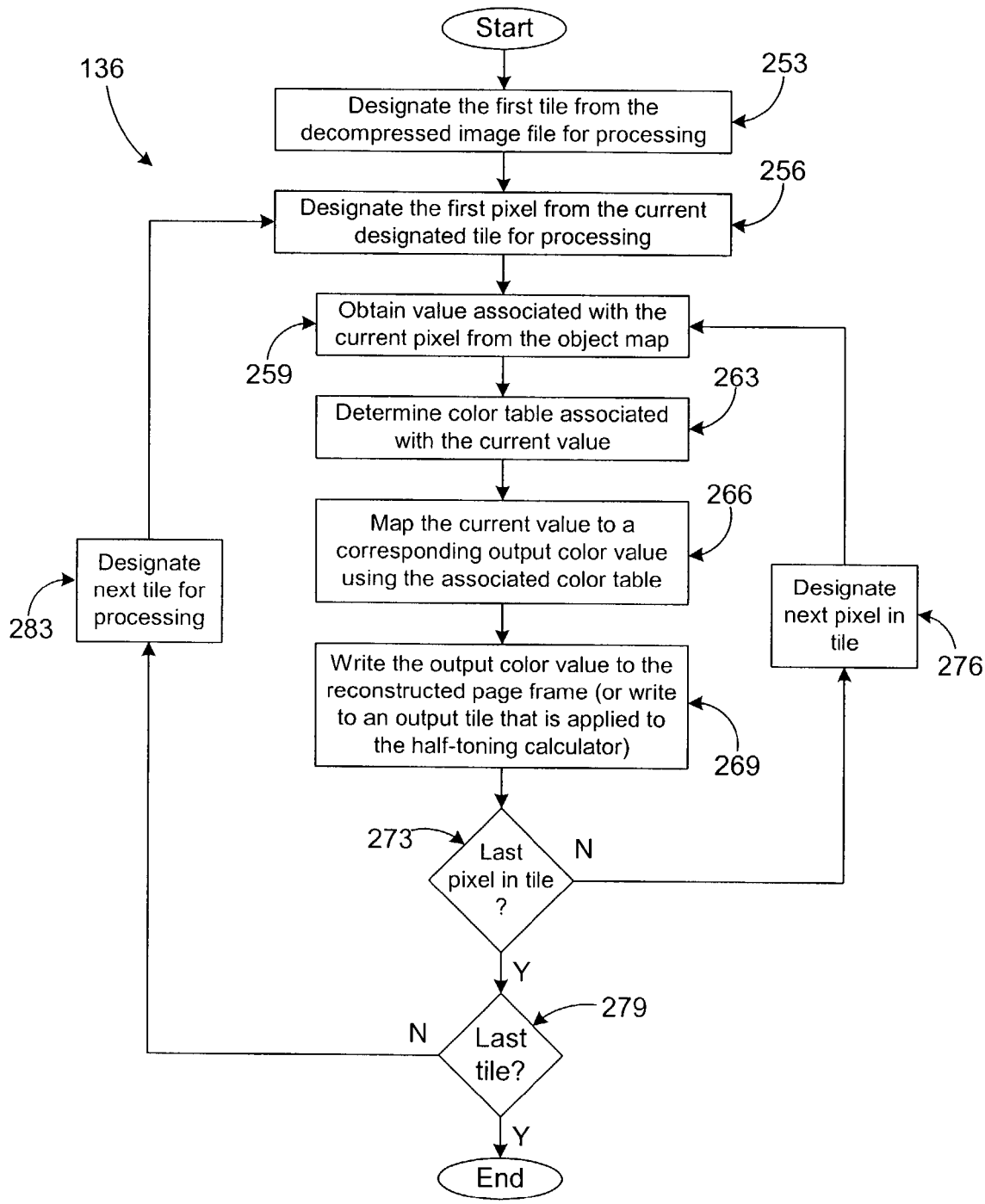
FIG. 5 depicts an exemplary flow chart of a color space converter that is executed in the printer of FIG. 3 during the reconstruction of the page frame from the compressed image file.

Referring next to FIG. 5, shown is a flow chart that provides one example of the operation of the color space converter 136 to perform various color space conversions for the pixels obtained from the compressed image file 113 according to an embodiment of the present invention. Alternatively, the flow chart of FIG. 5 may be viewed as depicting steps of an example of a method implemented in the printer 180 to perform various color space conversions for the pixels obtained from the compressed image file 113. The functionality of the color space converter 136 as depicted by the exemplary flow chart of FIG. 5 may be implemented, for example, in an object oriented design or in some other programming architecture. Assuming the functionality is implemented in an object oriented design, then each block represents functionality that may be implemented, for example, in one or more methods that are encapsulated in one or more objects. The color space converter 136 may be implemented using any one of a number of programming languages such as, for example, C++, JAVA™, or other programming languages.

Beginning with box 253, the color space converter 136 first designates a first tile from the compressed image file 113 for processing. Thereafter, in box 256 the color space converter 136 designates a first pixel from the current designated tile for processing. Next, in box 259 the color space converter 136 obtains a value from the object map 116 (FIG. 1) that corresponds with the current pixel. Thereafter, in box 263, the color conversion table 139 associated with the current value from the object map 116 is identified. Thereafter, in box 266, the color value associated with the current pixel is mapped to an output color value using the associated color conversion table 139 as was described with reference to FIG. 2 above. In this respect, a color space conversion is performed. The color conversion table 139 employed may be, for example, a blank color conversion table or one of a number of CMY-to-CMYK color conversion tables that provide a corresponding number of degrees of gray component replacement. In addition, other color conversion tables may be employed.

Then, in box 269, the output color value for the current pixel is written to the reconstructed page frame 153 (FIG. 2). Alternatively, the output color value may be written to a tile 143 (FIG. 2) that is to be applied to the half-toning calculator 146 (FIG. 2). Thereafter, in box 273, the color space converter 136 determines if the last pixel in the current tile has been processed. If not, then the color space converter 136 proceeds to box 276. Otherwise, the color space converter 136 proceeds to box 279. In box 276, the color space converter 136 designates the next pixel in the current tile for processing. Thereafter, the color space converter 136 reverts back to box 259 as shown.

Assuming that the color space converter 136 has proceeded to box 279, the color space converter 136 determines whether the last file obtained from the compressed image file 113 has been processed. If so, then the color space converter 136 ends accordingly. Otherwise, the color space converter 136 moves to box 283 in which the next tile is designated for processing. Thereafter, the color space converter 136 reverts back to box 256 as shown. The color space converter 136 is executed for each page frame 103/compressed image file 113, although other approaches may be employed where the color space converter 136 is executed in a loop that processes multiple pages, etc.

Figure 6:
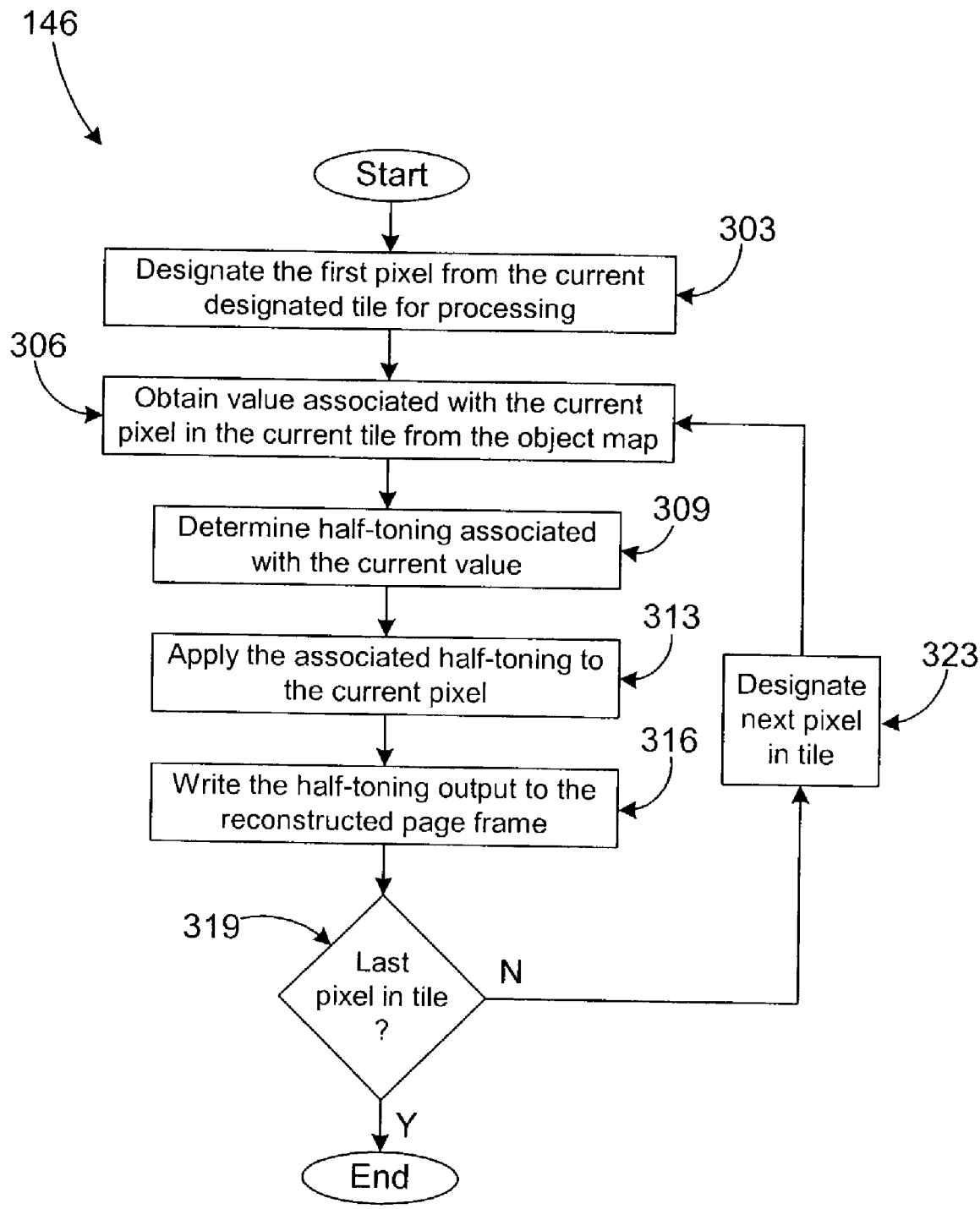
FIG. 6 depicts an exemplary flow chart of a half-toning calculator that is executed in the printer of FIG. 3 during the reconstruction of the page frame from the compressed image file.

Referring next to FIG. 6, shown is a flow chart that provides one example of the operation of the half-toning calculator 146 that applies a half-toning to respective ones of the pixels based upon the corresponding values in the object map 116 according to an embodiment of the present invention. Alternatively, the flow chart of FIG. 6 may be viewed as depicting steps of an example of a method implemented in the printer 180 to apply a half-toning to respective ones of the pixels based upon the corresponding values in the object map 116. The functionality of the half-toning calculator 146 as depicted by the exemplary flow chart of FIG. 6 may be implemented, for example, in an object oriented design or in some other programming architecture. Assuming the functionality is implemented in an object oriented design, then each block represents functionality that may be implemented, for example, in one or more methods that are encapsulated in one or more objects. The half-toning calculator 146 may be implemented using any one of a number of programming languages such as, for example, C++, JAVA™, or other programming languages.

Beginning with box 303, the half-toning calculator 146 designates a first pixel from a tile 143 received from the color space converter 136 for processing. Thereafter, in box 306, the half-toning calculator 146 obtains a value associated with the current designated pixel from the object map 116. Then, in box 309 the half-toning calculator 146 identifies the type of half-toning that is associated with the current value taken from the object map 116. In this respect, the types of half-toning such as, for example, either high-frequency or low frequency, etc., that are associated with the various values within the object map 116 are predetermined. Then, in box 313, the half-toning calculator 146 applies the respective half-toning to the current pixel. Thereafter, in box 316, the output of the application of the half-toning to the current pixel is written to the reconstructed tile 149. Next, in box 319, the half-toning calculator 146 determines whether the last pixel in the current tile has been processed. If not, then the half-toning calculator 146 proceeds to box 323 in which the next pixel is designated for processing from the current tile 143. Thereafter, the half-toning calculator 146 reverts back to box 306. Otherwise, the half-toning calculator 146 ends accordingly. Thus, the half-toning calculator 146 applies an appropriate half-toning to each pixel extracted from the compressed image file 113 in order to generate the reconstructed page frame 153.

Although the decomposer 109, color space converter 136, and half-toning calculator 146 are described as being embodied in software or code executed by general purpose hardware as discussed above, as an alternative the each may also be embodied in dedicated hardware or a combination of software/general purpose hardware and dedicated hardware. If embodied in dedicated hardware, the decomposer 109, color space converter 136, and/or half-toning calculator 146 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and flow charts of FIGS. 1–6 show the architecture, functionality, and operation of an implementation of the decomposer 109, color space converter 136, and/or half-toning calculator 146. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagrams and flow charts of FIGS. 1–6 show a specific order of execution, it is understood that the order of execution may differ from that which is depicted. For example, the order of execution of two or more blocks may be scrambled relative to the order shown. Also, two or more blocks shown in succession in FIGS. 1–6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the decomposer 109, color space converter 136, and/or half-toning calculator 146 comprises software or code, they can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the decomposer 109, color space converter 136, and/or half-toning calculator 146 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for compression of a page frame that includes a number of pixels, comprising the steps of:
   generating an object map that includes a number of values, each of the values being associated with a corresponding one of the pixels in the page frame;
   generating a compressed image file of the page frame that is associated with the object map; and
   indicating with each of the values in the object map whether a blank color conversion or one of a number of predefined color conversions is to be performed during a reconstruction of a corresponding one of the pixels, wherein each of the predefined color conversions includes a corresponding degree of gray component replacement.

2. The method of claim 1, further comprising the step of indicating a half-toning associated with a number of the pixels with a corresponding number of the values in the object map.

3. The method of claim 1, wherein the step of generating the object map further comprises the step of identifying a number of blank ones of the pixels.

4. The method of claim 3, wherein the step of generating the object map further comprises the step of writing a blank color conversion value to the object map for each of the blank ones of the pixels.

5. The method of claim 1, wherein the step of generating the object map further comprises the step of identifying a number of the pixels that are comprised of a color that that is subject to one of the predefined color conversions that includes the corresponding degree of gray component replacement.

6. The method of claim 5, wherein the step of generating the object map further comprises the step of writing a color conversion value that corresponds to the corresponding degree of gray component replacement to the object map for each of the pixels that is subject to the one of the predefined color conversions that includes the corresponding degree of gray component replacement.

7. A system for compression of a page frame that includes a number of pixels, comprising:
   a processor circuit having a processor and a memory;
   compression logic stored in the memory and executable by the processor, the compression logic comprising:
      logic that generates an object map that includes a number of values, each of the values being associated with a corresponding one of the pixels in the page frame, wherein each of the values indicates whether a blank color conversion or one of a number of predefined color conversions is to be performed during a reconstruction of a corresponding one of the pixels, wherein each of the predefined color conversions includes a corresponding degree of gray component replacement; and logic that generates a compressed image file of the page frame that is associated with the object map.

8. The system of claim 7, wherein a number of the values in the object map indicate a half-toning associated with a corresponding number of the pixels.

9. The system of claim 7, wherein the logic that generates the object map that includes the number of values further comprises logic that identifies a number of blank ones of the pixels.

10. The system of claim 9, wherein the logic that generates the object map that includes the number of values further comprises logic that writes a blank color conversion value to the object map for each of the blank ones of the pixels.

11. The system of claim 7, wherein the logic that generates the object map that includes the number of values further comprises logic that identifies a number of the pixels that are comprised of a color that that is subject to one of the predefined color conversions that includes the corresponding degree of gray component replacement.

12. The system of claim 11, wherein the logic that generates the object map that includes the number of values further comprises logic that writes a color conversion value that corresponds to the corresponding degree of gray component replacement to the object map for each of the pixels that is subject to the one of the predefined color conversions that includes the corresponding degree of gray component replacement.

13. A program embodied in a computer readable medium for compression of a page frame that includes a number of pixels, comprising:
   code that generates an object map that includes a number of values, each of the values being associated with a corresponding one of the pixels in the page frame, wherein each of the values indicates whether a blank color conversion or one of a number of predefined color conversions is to be performed during a reconstruction of a corresponding one of the pixels, wherein each of the predefined color conversions includes a corresponding degree of gray component replacement; and
   code that generates a compressed image file of the page frame that is associated with the object map.

14. The program embodied in the computer readable medium of claim 13, wherein a number of the values in the object map indicate a half-toning associated with a corresponding number of the pixels.

15. The program embodied in the computer readable medium of claim 13, wherein the code that generates the object map that includes the number of values further comprises code that identifies a number of blank ones of the pixels.

16. The program embodied in the computer readable medium of claim 9, wherein the code that generates the object map that includes the number of values further comprises code that writes a blank color conversion value to the object map for each of the blank ones of the pixels.

17. The program embodied in the computer readable medium of claim 13, wherein the code that generates the object map that includes the number of values further comprises code that identifies a number of the pixels that are comprised of a color that that is subject to one of the predefined color conversions that includes the corresponding degree of gray component replacement.

18. The program embodied in the computer readable medium of claim 17, wherein the code that generates the object map that includes the number of values further comprises logic that writes a color conversion value that corresponds to the corresponding degree of gray component replacement to the object map for each of the pixels that is subject to the one of the predefined color conversions that includes the corresponding degree of gray component replacement.

19. A system for compression of a page frame that includes a number of pixels, comprising:
   means for generating an object map that includes a number of values, each of the values being associated with a corresponding one of the pixels in the page frame, wherein each of the values indicates whether a blank color conversion or one of a number of predefined color conversions is to be performed during a reconstruction of a corresponding one of the pixels, wherein each of the predefined color conversions includes a corresponding degree of gray component replacement; and
   means for generating a compressed image file of the page frame that is associated with the object map.

20. The system of claim 19, wherein a number of the values in the object map indicate a half-toning associated with a corresponding number of the pixels.

* * * * *

UNITED STATES PATENT AND TRADEMARK OFFICE
CERTIFICATE OF CORRECTION

| | | |
|---|---|---|
| PATENT NO. | : 7,146,058 B2 | |
| APPLICATION NO. | : 10/423623 | |
| DATED | : December 5, 2006 | |
| INVENTOR(S) | : Randall E. Grohs | |

It is certified that error appears in the above-identified patent and that said Letters Patent is hereby corrected as shown below:

In column 12, line 42, in Claim 5, after "color that" delete "that".

In column 13, line 18, in Claim 11, after "color that" delete "that".

In column 14, line 7, in Claim 16, delete "claim 9," and insert -- claim 13, --, therefor.

In column 14, line 15, in Claim 17, after "color that" delete "that".

Signed and Sealed this

Ninth Day of December, 2008

JON W. DUDAS
*Director of the United States Patent and Trademark Office*